(12) United States Patent
Chen et al.

(10) Patent No.: US 11,995,083 B2
(45) Date of Patent: May 28, 2024

(54) MAINTAINING QUERY PERFORMANCE DURING HIGH CONCURRENCY OPERATIONS

(71) Applicant: International Business Machines Corporation, Armonk, NY (US)

(72) Inventors: Xiao Xiao Chen, Beijing (CN); Sheng Yan Sun, Beijing (CN); Peng Hui Jiang, Beijing (CN); Ying Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/047,669

(22) Filed: Oct. 19, 2022

(65) Prior Publication Data

US 2024/0134853 A1    Apr. 25, 2024

(51) Int. Cl.
  *G06F 17/00* (2019.01)
  *G06F 11/34* (2006.01)
  *G06F 16/2453* (2019.01)
  *G06F 16/28* (2019.01)

(52) U.S. Cl.
  CPC .... *G06F 16/24542* (2019.01); *G06F 11/3419* (2013.01); *G06F 16/285* (2019.01)

(58) Field of Classification Search
  CPC ............. G06F 16/24542; G06F 16/285; G06F 11/3419
  See application file for complete search history.

(56) References Cited

U.S. PATENT DOCUMENTS

| | | | | |
|---|---|---|---|---|
| 5,940,819 A | * | 8/1999 | Beavin | G06F 16/217 |
| 9,213,741 B2 | * | 12/2015 | Burger | G06F 16/24542 |
| 9,734,203 B2 | | 8/2017 | Feng | |
| 10,572,480 B2 | * | 2/2020 | Li | G06F 16/24545 |
| 11,687,531 B2 | * | 6/2023 | Hwang | G06F 16/24549 |
| | | | | 707/718 |

(Continued)

FOREIGN PATENT DOCUMENTS

CN    107528864 A    12/2017

OTHER PUBLICATIONS

Waikeat Tan et al., Query predicate selectivity using machine learning in Db2® In Proceedings of the 31st Annual International Conference on Computer Science and Software Engineering, IBM Corp., USA, 143-152. Nov. 2021.*

*Primary Examiner* — Greta L Robinson
(74) *Attorney, Agent, or Firm* — Daniel M. Yeates

(57) ABSTRACT

A computer-implemented method dynamically switches access plans for a query during concurrent query execution. The method includes receiving a first query configured to be processed by a database system. The method also includes generating, for the first query, an access plan for each of identified resource sets. The method includes determining a first set of available resources that represent an available capacity for the database system. The method further includes selecting a first resource set of the one or more resource sets, where the selecting is based on the first set of available resources being closest to the first resource set. The method also includes selecting, based on the first set of available resources, a first access plan of the one or more access plans. The method includes executing the first query and returning results of the first query to a source of the first query.

20 Claims, 4 Drawing Sheets

(56) References Cited

U.S. PATENT DOCUMENTS

| | | | |
|---|---|---|---|
| 2019/0146971 A1* | 5/2019 | Konik | G06F 16/196 |
| | | | 707/718 |
| 2021/0133195 A1 | 5/2021 | Jiang | |
| 2021/0165796 A1* | 6/2021 | Konik | G06F 16/252 |
| 2022/0019587 A1 | 1/2022 | Chen | |
| 2022/0067046 A1 | 3/2022 | Katroulis | |
| 2022/0107937 A1 | 4/2022 | Adivi | |

\* cited by examiner

US 11,995,083 B2

MAINTAINING QUERY PERFORMANCE DURING HIGH CONCURRENCY OPERATIONS

BACKGROUND

The present disclosure relates to database management, and, more specifically, to maintaining effective database performance during high concurrency operations.

Modern database systems can contain relatively large amounts of data. This data can be processed, updated, retrieved, and/or otherwise used to many purposes. Queries can be used to process the data stored in various databases. A single query can retrieve data from multiple data sources, which can result in a variety of potential flow paths to execute the query.

SUMMARY

Disclosed is a computer-implemented method to dynamically switch access plans during concurrent query execution. The method includes receiving a first query configured to be processed by a database system, wherein the database system is configured to execute two or more queries concurrently. The method further includes identifying one or more resource sets. The method also includes generating, for the first query, an access plan for each of the one or more resource sets. The method includes determining a first set of available resources that represent an available capacity for the database system. The method further includes selecting a first resource set of the one or more resource sets, wherein the selecting is based on the first set of available resources being closest to the first resource set. The method also includes selecting, based on the first set of available resources, a first access plan of the one or more access plans. The method includes executing the first query and returning results of the first query to a source of the first query. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
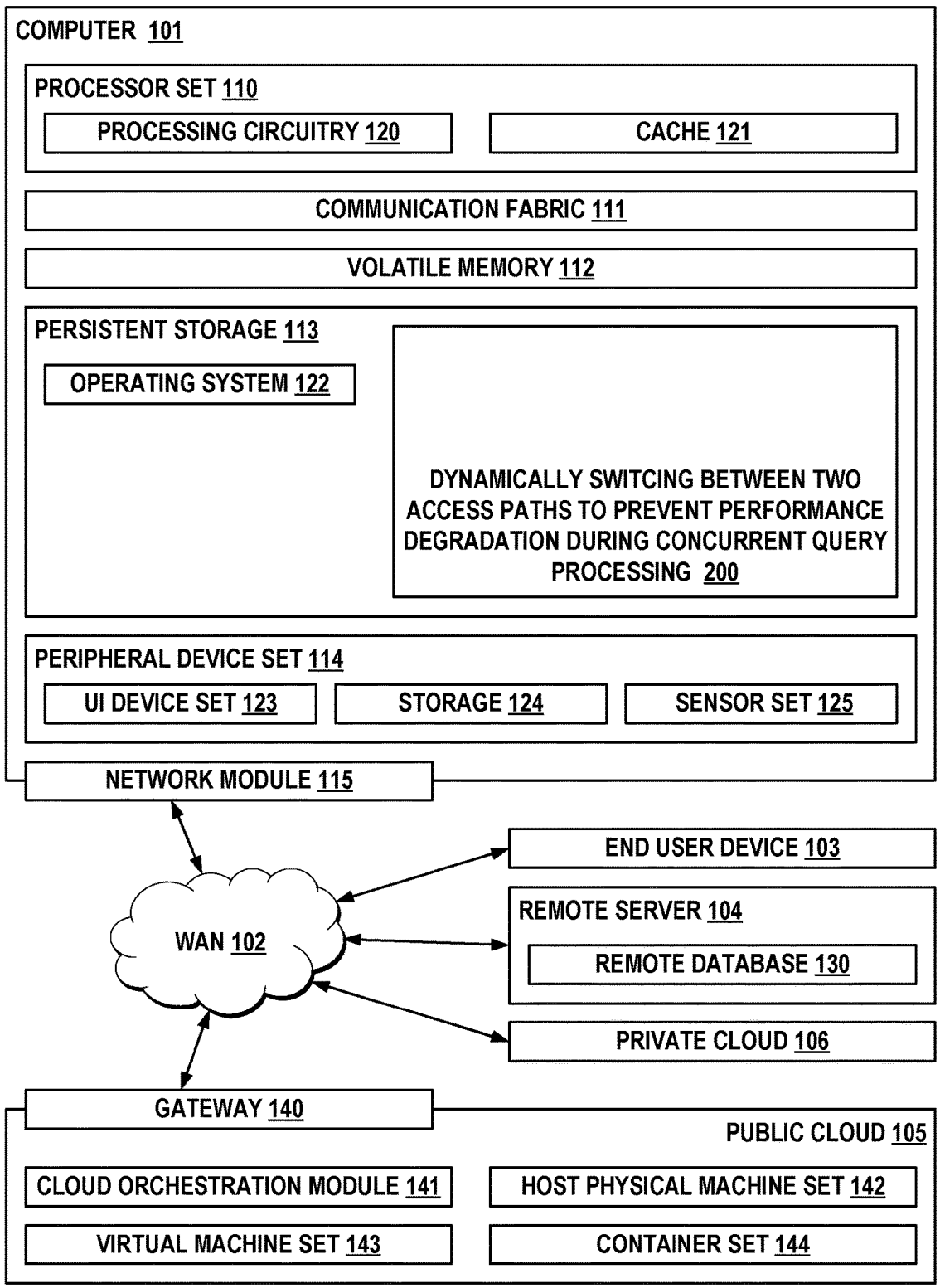
FIG. 1 is a block diagram of a computing environment suitable for initiating dynamically switching between two access paths to prevent performance degradation during concurrent query processing, in accordance with some embodiments of the present disclosure.

The present disclosure relates to database management, and, more specifically, to preventing performance degradation of query execution during high concurrency operations.

Modern database systems can contain relatively large amounts of data. This data can be processed, updated, retrieved, and/or otherwise used to many purposes. Queries can be used to process the data stored in various databases. A single query can retrieve data from multiple data sources, which can result in a variety of potential flow paths to execute the query.

In order to reduce performance degradation for database operations during high concurrency operations, embodiments of the present disclosure can dynamically alter the access plan based on changes in available system resources.

Computing environment 100 contains an example of an environment for the execution of at least some of the computer code involved in performing the inventive method, such as dynamically switching between two access paths to prevent performance degradation during concurrent query processing in block 200. In addition to dynamically switching between two access paths to prevent performance degradation during concurrent query processing in block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and dynamically switching between two access paths to prevent performance degradation during concurrent query processing block 200, as identified above), peripheral device set 114 (including user interface (UI), device set 123, storage 124, and sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. Performance of a computer-implemented method may be distributed among multiple computers and/or between multiple locations. On the other hand, in this presentation of computing environment 100, detailed discussion is focused on a single computer, specifically computer 101. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Sensor set 125 is made up of sensors that can be used in Internet of Things or other applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Modern database systems can contain relatively large amounts of data. This data can be processed, updated, retrieved, and/or otherwise used to many purposes. Queries can be used to process the data stored in various databases. A single query can retrieve data from multiple data sources, which can result in a variety of potential flow paths to execute the query. Modern database systems can contain relatively large amounts of data. This data can be processed, updated, retrieved, and/or otherwise used to many purposes. Queries can be used to process the data stored in various databases. A single query can retrieve data from multiple data sources, which can result in a variety of potential flow paths to execute the query.

The optimizer can estimate a cost to execute the query for each path and select and execute the lowest cost access path. Accurately selecting the true lowest cost access path (or query plan or access plan) can greatly increase the overall efficiency of database system. The optimizer can estimate a cost to execute the query for each path and select and execute the lowest cost path. The estimated cost may be based on computing resources and/or computational time.

During generation of the access plans, the database system makes various assumptions about the availability of system resources. However, if there is a change in system resources after the access path is chosen but before the query is fully executed, then what was an efficient flow path can become very inefficient. For example, assume a first query uses a particular flow path that uses a large amount of a limited resource. If a different thread is concurrently processing a second query and uses that same limited resource, the first query can be stuck waiting for the necessary amount of resource. A query that would be processed relatively quickly can take significantly longer to complete or be stalled indefinitely.

Embodiments of the present disclosure are configured to reduce performance degradation during execution of a query based on changes in system resources during concurrent processing of two or more queries. Said differently, embodiments of the present disclosure can maintain efficient execution of queries during high concurrence operations. High concurrence operations can include any situation where two or more queries are being executed simultaneously. In some embodiments, the database includes a query manager. The query manager is configured to generate and select an access path for a query to reduce performance degradation and/or maintain efficiency. They query manager can generate one or more different access paths to complete the query. In some embodiments, each access path is based on a set of available system resources, a resource set. For purposes of this application, a resource set is a set of resources available to execute a query. The available resources in a resource set can be all of the unutilized computing resources available to a database system to process queries. In some embodiments, the resource set can be derived from determining a set of resources that is currently being used and/or scheduled for use to execute one or more queries.

In some embodiments, the resources sets include a defined set of values for each relevant computing resource. Each resources set has at least one different value than all the other resource sets. In some embodiments, there can be any number of resource sets.

The resource sets can be determined by gathering data during concurrent query operations. In some embodiments, the query manager dynamically alters the access plan during operations based on a change in available resources and/or operations of the system due to concurrently processing one or more different queries. The various gathered data points can then be clustered to determine the resource sets. In some embodiments, a clustering algorithm is used to cluster the various data points.

In some embodiments, a query manager receives and parses a query. In some embodiments, the query manager can generate one more access plans for each received query. In some embodiments, each access path includes one or more steps to execute the query. A step may be one logical operation of the query (e.g., fetch, sort, merge, etc.). The number of steps can be consistent with the number of scan, insert, update, join, and sort commands in the query. A step can be a portion of an access plan. Said differently, each access plan can be divided into one or more steps. In some embodiments, the query manager generates at least one access plan for each of the defined resource sets. This may provide more than one execution option if the available resources changes during execution of the query.

In some embodiments, the query manager can use the resource sets to train a learning model. The learning model may be configured to reflect the relationship between the system resources and efficient runtime structures. In some embodiments, the query manager can identify one or more groups of the various steps of the different access plans. In some embodiments, each group represents interchangeable steps between two different access plans. For example, a first access plan may have a nested loop join command to link to different tables, and a second access plan may have a hybrid joint command to join the two tables. These two commands would be interchangeable because they would produce the same result for the query.

In some embodiments, the query manager monitors available system resources during execution the query. After completion of each set, the query manager evaluates which available access path is available to perform the next step of the execution. The query manager may dynamically switch between the generated access plans. In some embodiments, the available access paths are selected from a group for the next step in the execution plan. In some embodiments, the next stop is selected by the learning model. This may prevent the query from being bogged down by having preselected the now inefficient access path.

The aforementioned advantages are example advantages, and embodiments exist that can contain all, some, or none of the aforementioned advantages while remaining within the spirit and scope of the present disclosure.

Figure 2:
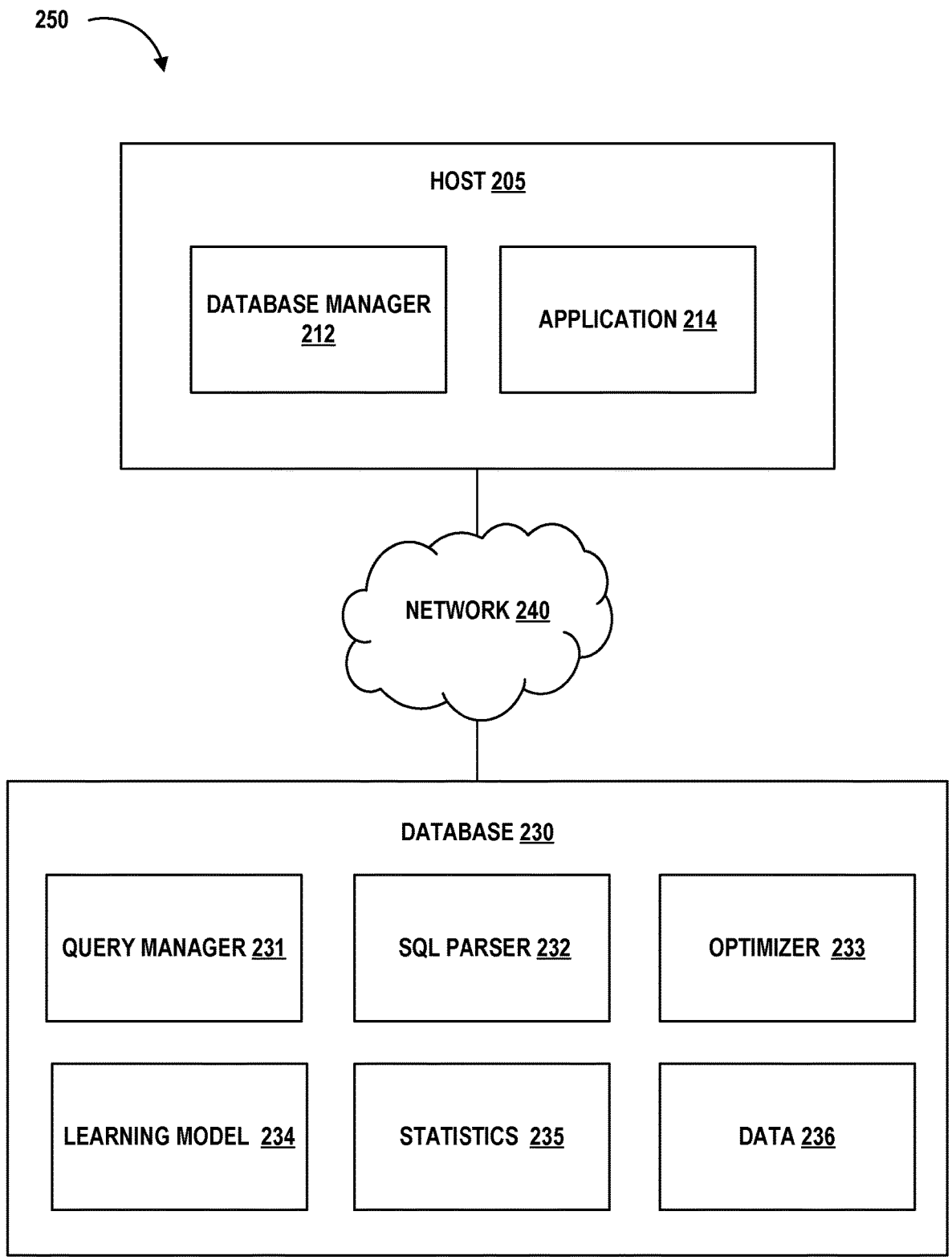
FIG. 2 is a block diagram of a computing environment suitable for operation of a query manager, in accordance with some embodiments of the present disclosure.

Referring now to various embodiments of the disclosure in more detail, FIG. 2 is a representation of a computing environment 250, that is capable of running a query manager configured to dynamically switch between access paths to prevent performance degradation running, consistent with block 200 of FIG. 1 in accordance with one or more embodiments of the present disclosure. Many modifications to the depicted environment may be made by those skilled in the art without departing from the scope of the disclosure.

Computing environment 250 includes host 205, database 230, and network 240. In some embodiments, host 205 and/or database 230 can be consistent with computer 101 of FIG. 1.

Network 240 can be, for example, a telecommunications network, a local area network (LAN), a wide area network (WAN), such as the Internet, or a combination of the three, and can include wired, wireless, or fiber optic connections. Network 240 may include one or more wired and/or wireless networks that are capable of receiving and transmitting data, voice, and/or video signals, including multimedia signals that include voice, data, and video information. In general, network 240 may be consistent with WAN 102 of FIG. 1.

Host 205 can be a standalone computing device, a management server, a web server, a mobile computing device, or any other electronic device or computing system capable of receiving, sending, and processing data. In some embodiments, host 205 can generate one or more queries to be processed by database 230. In some embodiments, host 205 includes database manager 212 and application 214. In some embodiments, computing environment 250 includes one or more additional computing devices consistent with host 205, however, only host 205 is shown for discussion purposes.

Database manager 212 can be any combination of hardware and/or software configured to manage database operations. The operations may include storing, retrieving, querying, manipulating, monitoring, and analyzing data along with other similar operations. In some embodiments, database manager 212 includes a database management system (DBMS). In some embodiments, database manager 212 is part of a federated database system (which may include database 230). A federated database system can transparently map multiple autonomous database systems into a single federated (combined) database. In some embodiments, a federated database system acts as a virtual database, where there is no actual data integration in the constituent databases. In some embodiments, database manager 212 can be a local interface for database 230.

Application 214 can be any combination of hardware and/or software that is configured to generate a query and/or display the results of the query. A query can be a request for data and/or information stored in one or more tables of one or more databases. The databases may be local (e.g., on host 205), or remote (e.g., database 230). In some embodiments, application 214 sends the query to database manager 212. In some embodiments, the queries generated by application 214 can be sent as a batch to database manager 212 and/or database 230. In some embodiments, the queries can be sent on an as need basis and/or continuously. In some embodiments, application 214 is included in database manager 212. In some embodiments, application 212 can generate/send two or more different queries. In some embodiments, the query is generated in SQL. In some embodiments, application 214 displays the results of the query. The results may be returned in an SQL format, and/or as images, graphs, trends, and/or other similar formats.

In some embodiments, application 214 is part of a computing device separate from host 205. The computing device may communicate with host 205 via network 240. In some embodiments, the computing device can generate queries, send queries to host 205, and/or receive and display the results of the query. In some embodiments, application 214 can include (or be considered) two or more separate applications, wherein each application is configured to generate and send queries to database 230. In some embodiments, host 205 includes one or more applications consistent with application 214. Or said differently, application 214 can represent any number of unique applications.

Database 230 can be any combination of hardware and/or software configured to store data in a database system. In some embodiments, database 230 is part of a federated database system. A federated database system can be any number databases that appear as a single database to the requesting device (e.g., host 205, application 214, etc.). In some embodiments, database 230 includes two or more databases communicatively connected that can act as a single database. In some embodiments, database 230 may be contained within host 205. In some embodiments, database 230 can include query manager 231, SQL parser 232, optimizer 233, learning model 234, statistics 235, and data 236.

Query manager 231 can be any combination of hardware and/or software configured to oversee execution of an SQL query. In some embodiments, query manager 231 includes one or more of SQL parser 232, optimizer 233, learning model 234, statistics 235, and data 236. However, FIG. 2 depicts them as separate components for discussion purposes.

In some embodiments, query manager 231 managers/oversees execution of one or more queries in database 230. In some embodiments, query manager 231 selects one of the generated access paths to execute the query. In some embodiments, query manager 231 can dynamically switch between access paths. The switch can be based on a change in usage of system resources. In some embodiments, query manager 231 can monitor the available system resources. The available resource can be correlated to a resource set, a predetermined set of available resources used as an assumption for generating access paths. In some embodiments, query manager 231 is configured to dynamically select a step from a different access path (different the current selection) based on current resource status correlated to an available step being a lower cost than the next step in the current access path. In some embodiments, execution time is the main resource used to switch between access paths.

In some embodiments, query manager 231 generates one or more resource sets. Each unique resource set has a different set of available resources. The system can identify when different resource sets are relevant based on overall load. In high concurrency environments, the available resources can change frequently and different queries and using and releasing the various resources within database 430.

The SQL parser 232 can be any combination of hardware and/or software configured to determine actions to be performed from a query. In some embodiments, SQL parser 232 determines individual commands to fully execute the query (e.g., return a set of data). In some embodiments, SQL parser 232 develops an access path for the queries. The access path may include a stack (set) of commands, where each command is considered a step. In some embodiments, optimizer 233 generates one or more access paths for each resource set. In some embodiments, SQL parser 232 can include optimizer 233.

In some embodiments, SQL parser 232 can separate the access path into a series of steps. In some embodiments, each step can include one command. In some embodiments, the number of steps is consistent with the number of fetch/scan, join, sort, update, delete, and/or insert commands. In some embodiments, the number of steps can be based on the number of logical operations required to execute the query. In some embodiments, each step includes a logical action. In some embodiments, each step includes all operations for one table, or until a second/next table will be accessed.

Optimizer 233 can be any combination of hardware and/or software configured to identify an efficient access plan of the one or more access plans for a query. In some embodiments, the access plans can be configured for different resource sets (or different available resources). In some embodiments, optimizer 233 selects one query from one or more access paths for each resource set. The access path for each resource status is configured to be relatively efficient when using all of (or some of) the remaining available computing resources.

Learning model 234 can be any combination of hardware and/or software configured to prevent performance degradation of query processing in high concurrence environments. In some embodiments, learning model 234 includes one or more learning models. In some embodiments, learning model 234 can be trained and/or updated by data in statistics 235. In some embodiments, learning model 234 can use supervised learning techniques. In supervised learning, the data is tagged such that the model can learn to mimic the results, or compare new inputs to the tagged training data.

In some embodiments, learning model 234 can determine a set of resource sets. The resource sets can be determined by a clustering algorithm. During execution of one or more queries, query manager 231 can record/monitor the available resources. Any number of users may alter the frequency and sampling point of system resources. The clustering algorithm can generate representative resource sets. Each resource set represents an amount of system resources being consumed during execution of one or more queries and/or resources available to execute a query. Various sampled points can be grouped into a resource set. There can be any number of resource sets. In some embodiments, the number of resource sets is based on amounts of sampled data. Each data point can be divided into any number of groups, and there can be any number of data points. For example, in one system, the monitored data points include a record identifier (RID) pool usage, and a data caching usage. For each data point, the value can be considered high, or low. Then there would be four sets of system resources. In some embodiments, the clustering groups data sets such that each data point in a set is more similar, in some aspect, to the rest of the data points in the cluster, than the data in the different clusters. In some embodiments, the values used in the resource status can be based on all the data points in the cluster.

In some embodiments, learning model 234 can generate one or more access paths for each resource set. The generation can be in conjunction with SQL parser 232 and/or optimizer 233.

In some embodiments, learning model 234 identifies a lowest cost access plan and/or step. The lowest cost can be based on the available system resources. In some embodiments, learning model 234 can identify a resource status (previously clustered) for a current status of the database system. The selection of the access path/next step can be based on the current available resources. On occasion, the selected step may have a higher processing time than another option if both were run alone (with all available resources), but based on the current available resources (system load), the selected path will have a lower processing time.

In some embodiments, learning model 234 can identify groups of steps. Each group can have two or more steps from different access plans, where the different access plans are configured for different resource sets. Each step within a group can be interchangeable. Interchangeable may mean that if the step is replaced, the results of the query will not change. In some embodiments, as various steps are completed, the groups may change. Or, said differently, the groups may be updated after completion of each step.

In some embodiments, learning model 234 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, learning model 234 may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Statistics 235 can be any combination of hardware and/or software configured to store database statistics. In some embodiments, statistics 235 can include database statistics. In some embodiments, statistics 235 tracks distribution of values in the tables and indexes in the database (e.g., data 236). In some embodiments, statistics 235 is updated and maintained by database manager 212.

In some embodiments, database statistics 235 keeps a record of each query received. This can include one or more of the sources of the query (e.g., application 214), the structure, the target data, system usage, processing time, resources utilized, and other similar data. In some embodiments, the record of query data can be used as training data for learning model 234. In some embodiments, the training data is tagged for supervised learning. The tags can include a resource status, a specific/type of command, and the like. In some embodiments, the training data is stored based on source query. In some embodiments, the training data is stored by step type, by resource status, and the like. In some embodiments, the training data can be updated after each new query is executed and the statistics/data is recorded.

Data 236 can be any data structure configured to store and organize data. In some embodiments, data 236 can include one or more data structures. The data structures can include tables, indices (indexes), columns, and the like. The data structures can be the target of the queries. Data 236 can include one or more separate tables and/or one or more indexes. Each table/index can include one or more columns. In some embodiments, data 236 is a target of queries. In some embodiments, each step of the generated access plans is associated with one or more data structures within data 236.

Figure 3:
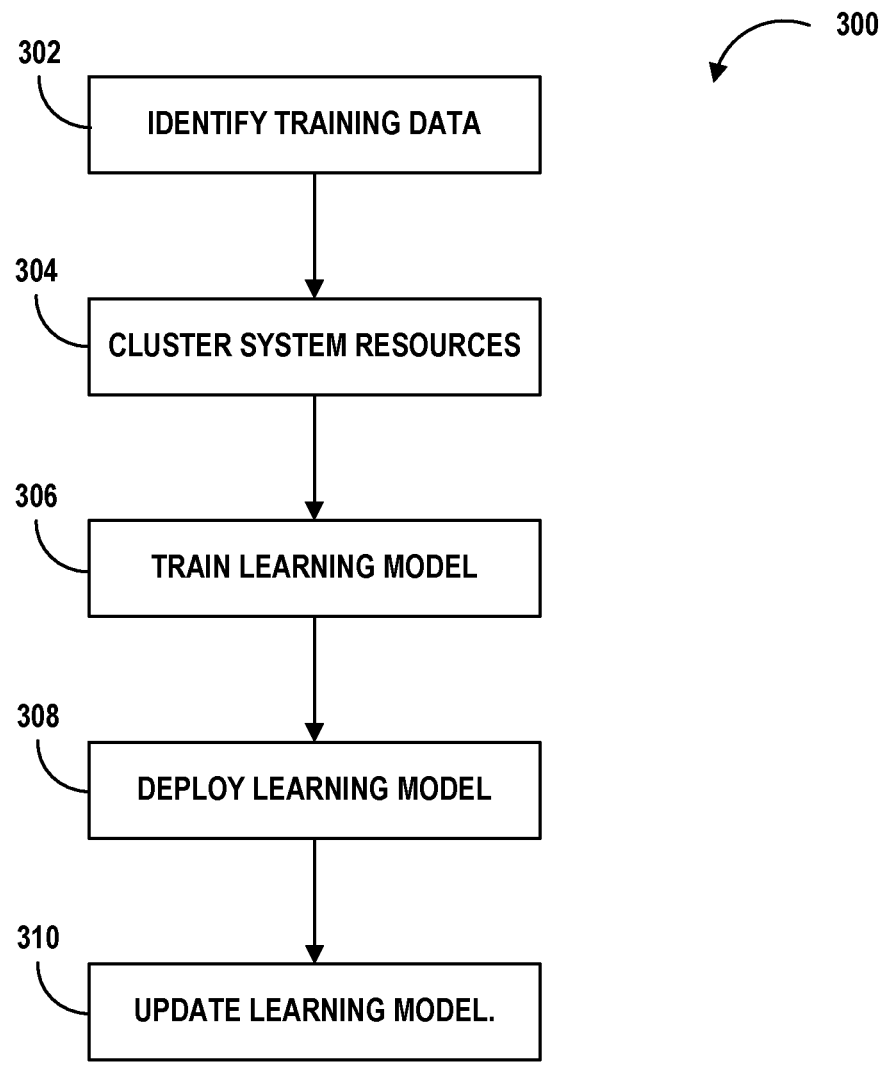
FIG. 3 illustrates a flow chart of an example method to train a learning a model to identify a lowest processing time for a query based on available resources, in accordance with some embodiments of the present disclosure.

FIG. 3 depicts a flowchart of an example method, method 300, for training a learning a model to identify a lowest processing time for a query based on available resources that can be performed in a computing environment (e.g., computing environment 100 and/or collaboration environment 250). One or more of the advantages and improvements described above for initiating unplanned interactions/conversations may be realized by method 300, consistent with various embodiments of the present disclosure.

Method 300 can be implemented by one or more processors, host 205, database manager 212, application 214, database 230, query manager 231, SQL parser 232, optimizer 233, learning model 234, statistics 235, data 236 and/or a different combination of hardware and/or software. In various embodiments, the various operations of method 300 are performed by one or more host 205, database manager 212, application 214, database 230, query manager 231, SQL parser 232, optimizer 233, and/or learning model 234. For illustrative purposes, the method 300 will be described as being performed by query manager 231.

At operation 302, query manager 231 identifies training data. In some embodiments, the training data is recorded from current and/or previously executed queries. The training data can include a query, an access plan, the computing cost, the time to execute, and system load (or system resource availability/utilization) during processing and the like. In some embodiments, each query that is executed can be added to the training data. In some embodiments, a subset of executed queries can be marked/identified as training data. In some embodiments, the training data can be imported from a similar database system.

At operation 304, query manager 231 runs the clustering algorithm. In some embodiments, the clustering algorithm is configured to identify resource sets representative availability of system resources. In some embodiments, operation 304 includes identifying one or more resource sets. Each resource set includes a value for each of a set of system resources. The value can be a utilized amount and/or an available amount. Each resource set can represent a cluster of actual samples. The selected values can be used to represent multiple data points.

At operation 306, query manager 231 trains the learning model. The learning model can be trained to correlate the resource sets with various runtime structures. The correlation can include good or bad markers for the structure at each resource set. The training can include predicting usage of particular resources based on a generated runtime structure (e.g., access plan or step of an access plan). In some embodiments, the training includes tagging various steps as good or bad (e.g., efficient, inefficient, timely or untimely) based on performance of the structure in the system resource group. As such, when a new query is sent to the learning model, it can predict which runtime structures will process and which will be bogged down waiting for system resources.

At operation 308, query manager 231 deploys the learning model. In some embodiments, the deployed model can be used in method 400 as described below. At operation 310, query manager 231 updates the learning model. The update can be based on the gathered data. In some embodiments, the update can be in response to execution of a query using method 400. The performance data during execution can be used as feedback to fine tune the learning model. The updates can include changing the representative value and/or the number of resource sets.

Figure 4:
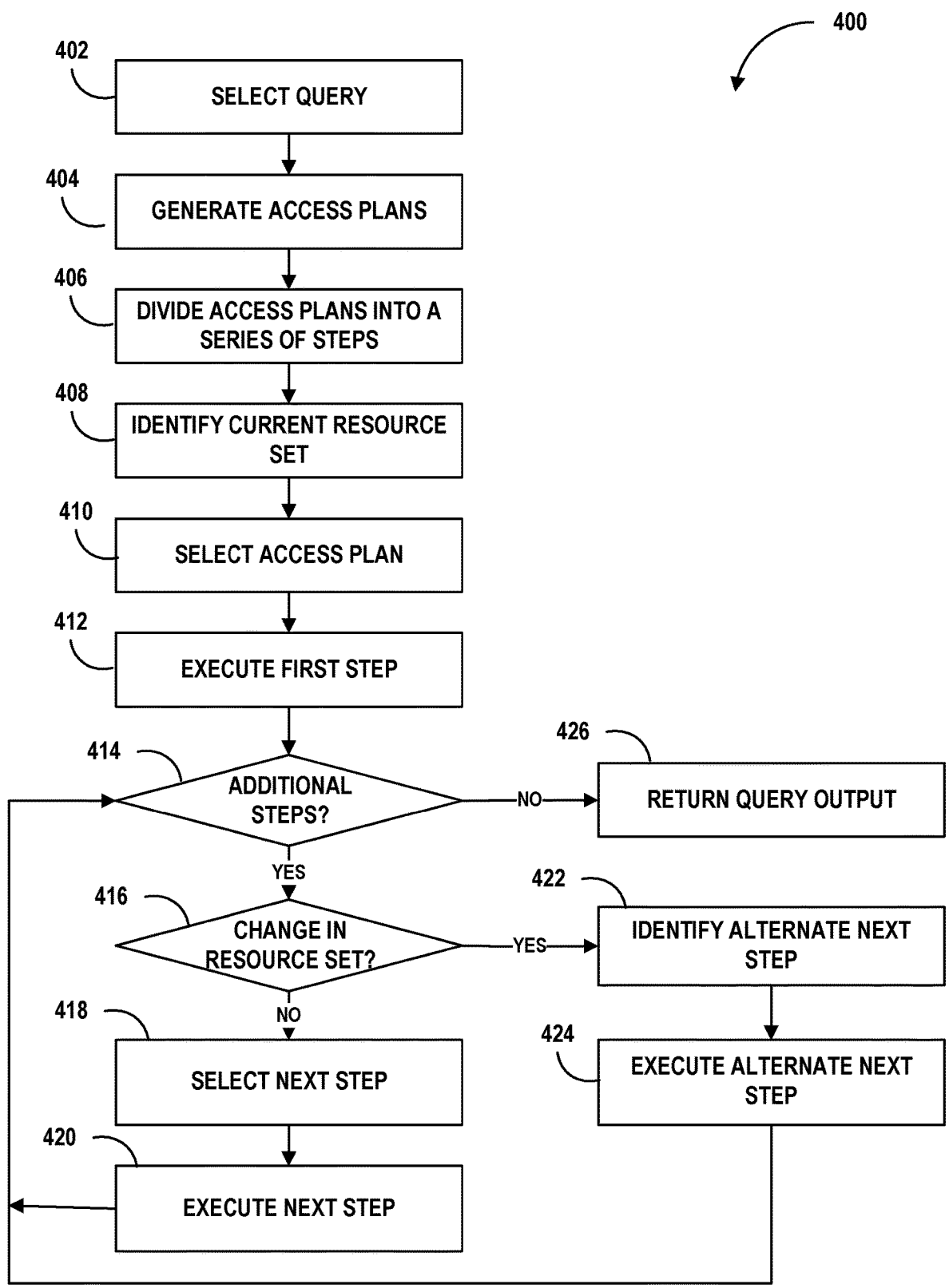
FIG. 4 illustrates a flow chart of an example method to dynamically alter a query access plan in a high concurrence environment, in accordance with some embodiments of the present disclosure.

FIG. 4 depicts a flowchart of an example method, method 400, for dynamically altering a query access plan in a high concurrence environment (e.g., computing environment 100 and/or collaboration environment 250). One or more of the advantages and improvements described above for initiating unplanned interactions/conversations may be realized by method 400, consistent with various embodiments of the present disclosure.

Method 400 can be implemented by one or more processors, host 205, database manager 212, application 214, database 230, query manager 231, SQL parser 232, optimizer 233, learning model 234, statistics 234, data 236 and/or a different combination of hardware and/or software. In various embodiments, the various operations of method 400 are performed by one or more host 205, database manager 212, application 214, database 230, query manager 231, SQL parser 232, optimizer 233, and/or learning model 234. For illustrative purposes, the method 400 will be described as being performed by query manager 231.

At operation 402, query manager 231 selects a query. In some embodiments, the selected query can be any query that is going to be processed by database 230. In some embodiments, the query can be received from host 205, database manager 212, and/or application 214. The query can be received individually and/or as part of a batch of queries. In some embodiments, the query is configured to be processed concurrently with one or more additional queries (e.g., a second query, etc.). In some embodiments, the query can be configured to access and/or process any amount of data stored in database 230 and/or data 236 and return the results to the source of the query.

At operation 404, query manager 231 generates one or more access plans for the selected query. In some embodiments, the one or more access paths are generated by SQL parser 232 and/or optimizer 233. Each of the one or more access paths can be configured to retrieve, insert, and/or process all data necessary to execute the query. Each access path can be different from all other access path generated. In some embodiments, query manager 231 generates all potential access paths. In some embodiments, up to a predetermined number of potential access paths are generated (e.g., no more than five different access paths). The number of access paths can be based on the number of resource sets. For example, there can be one or more access plan generated for each resource set. In some embodiments, operation 404 includes selecting one of the one or more access plans from each resource status. The selected access plan may be configured to be the access plan with the lowest estimated execution cost. The execution costs can be based on computing resources used and/or an estimated time to complete processing of the query.

At operation 406, query manager 231 divides each access plan into a series of steps. There can be one or more steps for each access plan. In some embodiments, each step is correlated to one or more logical actions within the access plan. The steps can be based on a table, a specific type of logical action (merge function, sort function, etc.), and the like. In some embodiments, operation 406, includes creating one or more groups of steps. Each step within a group can be interchangeable with a different step. For example, all steps in a group may merge selected data from two different tables, but the method of merging can be different.

In operation 408, query manager 231 identifies a current resource set of database 230. The current resource set can be based on the resources currently available to execute the selected query and/or and expected number of resources the selected query will use to during processing. In some embodiments the resource set is selected from the set of predetermined resources sets. The selection can be based on comparing the current available or currently in user resources, to the output of the clustering algorithm. The selected resource set may have the closest set of resources. In some embodiments, the resource set is determined by learning model 234.

At operation 410, query manager 231 selects an access path. The selected access path may be the access path associated with the identified resource set. In some embodiments, the selected access path is selected based on having the lowest estimated execution time to complete processing of the query, based on currently available system resources. The selected execution path may have a longer predicted execution time than a different access path if both queries were executed individually. However, the different access path can be predicted to become slower based on one or more specific resources being limited due to concurrently executed queries. In some embodiments, the one or more groups are generated in response to selecting the access path. Once a first step of the first access paths is known, query manager 231 can determine which later steps from the other generated access plans are interchangeable with the remaining steps in the selected access plan.

At operation 412, query manager 231 executes a first step of the selected access path. In some environments, the executions include performing logical step based on the query and/or the selected access plan.

In operation 414, query manager 231 determines if there are any additional steps to be executed in the query. In some embodiments, the determination is based on a location within the access plan. For example, if there are additional nodes (e.g., additional tables to access, additional joins to perform, etc.) or logical operations and their additional steps to perform. If it is determined there are additional steps to be executed for the query (414:YES), then query manager 231 proceeds to operation 416. If it is determined there are no additional steps to be executed for the query (414:NO), then query manager 231 proceeds to operation 426 return query output.

At operation 416, query manager 231 determines if there has been a change in the relevant resource set. The change in the relevant resource set can be based on a change in available system resources. In some embodiments, operation 416 can be consistent with operation 408. In some embodiments, operation 416 includes comparing identified resource set with the resource set identified in operation 408. In the identified resource, statuses are the same, and there is no change. There can be a change in current system utilization without having a change in the identified resource status. The new/current utilization can still be clustered with the previously identified resource status. If it is determined that there has been a change in available system resources (416: YES), then query manager 231 proceeds to operation 422 to determine an alternate step. If it is determined that there has not been a change in available system resources (418: NO), then query manager 231 proceeds to operation 418.

In some embodiments, operation 416 includes determining if the next step in the selected access plan is a lowest cost next step. This can be independent of a change in resource set. Query manager 231 may look for the next step of the selected access plan, and compare the estimated cost to all other steps in a common group with the next step. If query manager 231, determines an alternate step has a lower execution time, it may proceed to operation 422.

At operation 418, query manager 231 selects the next step from the selected access plan. Since there was no change in the resources set, the next step of the access plan is selected to be processed if it likely correlates with the lowest processing time. At operation 420, query manager 231 executes the next step from the selected access plan. In some embodiments, operation 420 can be consistent with operation 412 for the selected step. Upon completion of operation 420, query manager 231 returns to operation 414.

At operation 422 query manager 231 identifies an alternate next step. The alternate next step is generally selected for an access plan that was not selected at operation 414. In some embodiments, the alternate next step is predicted to have a lower execution time than the next step of the original selected query. The change can be based on the availability of one or more specific resources needed for the original step and/or the alternate step. In some embodiments, the alternate next step is in a group with the next step from the original selected query. At operation 424, query manager 231 executes the alternate next step. In some embodiments, operation 424 can be consistent with operations 412 and 420. Upon completion of operation 422, query manager 231 returns to operation 414.

At operation 426, query manager 231 returns the query output. The final results can be returned to the source of the query. The returned results are consistent, regardless of the access path taken and/or regardless of the number of times query manager 231 selected the alternate execution step. Operation 426 may include displaying the results according to instruction by host 205, database manager 212, and/or application 214.

A large number of alternate next steps can be chosen. In some embodiments, the alternate next step can be from an access path that was previously selected, then unselected (or the alternate next step was a different access path), and then selected. For example, for one query, there are four access paths, a first, second, third and fourth, each correlated to a first resource status, a second resource status, a third resource status, and a fourth resource status respectively. Each of the four access paths can have four steps. In one scenario, each time query manager 231 executes operation 416, there is a change in the resource status. The first step can be from the first access path, the second step from the second access path, the third from the third access path, and the fourth from the fourth access path. In another scenario, the first and second steps can be from the first access path, the third step from the third access path, and the fourth from the first access path. The factors that determine a switch from a current access path to an alternate is the availability of system resources, and a prediction of the execution time based on those resources. Each time query manager 231 passes through operation 414, the access plan with the last executed step (from operation 412, 420, or 424) may be considered the currently selected access path for the next pass through of operation 416.

Thus, even in a high concurrency, and a high fluctuations of system load, a query will not be bogged down and/or stuck due to limited resources if an alternate access plan is available. This can greatly increase the overall efficiency of database systems, in particular when there are multiple queries being processed concurrently.

Embodiments of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A computer-implemented method comprising:
receiving a first query configured to be processed by a database system, wherein the database system is configured to execute two or more queries concurrently;
identifying one or more resource sets;
generating, for the first query, an access plan for each of the one or more resource sets;
determining a first set of available resources that represent an available capacity for the database system;
selecting a first resource set of the one or more resource sets, wherein the selecting is based on the first set of available resources being closest to the first resource set;
selecting, based on the first set of available resources, a first access plan of the one or more access plans;
executing the first query; and
returning results of the first query to a source of the first query.

2. The computer-implemented method of claim 1, further comprising:
separating each access plan into a series of steps, wherein the executing the first query includes executing a first step of the first query.

3. The computer-implemented method of claim 2, further comprising:
grouping a second step of the access plan and a second step of a second access plan into a first group, wherein the second step of the first access plan and the second step of the second query are interchangeable.

4. The computer-implemented method of claim 3, wherein the executing the first query includes executing the second step of the second access plan.

5. The computer-implemented method of claim 4, further comprising:
identifying a second set of available resources has differences from the first set of available resources; and
determining the second set of available resources is correlated to a second resource set, and the executing the second step of the second access plan is in response to determining the second set of available resources is correlated to the second resource set.

6. The computer-implemented method of claim 2, further comprising:
identifying two or more potential next steps including a next step for the first access plan and a next alternate next step for a third access plan generated for a third resource set;
identifying, in response to executing the first step, a change in the first set of available resources to a second set of available resources;
determining the second set of available resources is closest to the third resource set;
switching from the first access plan to the third access plan; and
executing the alternate second step.

7. The computer-implemented method of claim 6, further comprising:
checking, in response to execution of each step, for a new change in the second set of available resources;
selecting, in response to determining the new change and that the new change is closer to a new resource set, a new access plan from the one or more access plans; and
executing a subsequent step of the first query according to the new access plan.

8. The computer-implemented method of claim 7, wherein the new access plan is the first access plan.

9. The computer-implemented method of claim 1, wherein the one or more access plans are configured to minimize a time required to execute the first query.

10. The computer-implemented method of claim 1, wherein the one or more resource sets are identified by a clustering algorithm.

11. The computer-implemented method of claim 10, wherein the clustering algorithm analyses previously executed queries at selected sampling times, and each resource set is correlated to a cluster previously executed queries with similar resource availability.

12. The computer-implemented method of claim 1, wherein the generating of each access plan and the selecting of the first resource set is performed by a learning model.

13. A system comprising:
a processor; and
a computer-readable storage medium communicatively coupled to the processor and storing program instructions which, when executed by the processor, are configured to cause the processor to:
receive a first query configured to be processed by a database system, wherein the database system is configured to execute two or more queries concurrently;
identify one or more resource sets;
generate, for the first query, an access plan for each of the one or more resource sets;
determine a first set of available resources that represent an available capacity for the database system;
select a first resource set of the one or more resource sets, wherein the selecting is based on the first set of available resources being closest to the first resource set;
select, based on the set of available resources, a first access plan of the one or more access plans;
execute the first query; and
return results of the first query to a source of the first query.

14. The system of claim 13, wherein the program instructions are further configured to cause the processor to:
identify two or more potential next steps including a next step for the first access plan and a next alternate next step for a third access plan generated for a third resource set;
identify, in response to executing the first step, a change in the first set of available resources to a second set of available resources;
determine, the second set of available resources is closest to the third resource set;
switch from the first access plan to the third access plan; and
execute the alternate second step.

15. The system of claim 13, wherein the one or more access plans are configured to minimize a time required to execute the first query.

16. The system of claim 13, wherein the one or more resource sets are identified by a clustering algorithm and the clustering algorithm analyses previously executed queries at selected sampling times, and each resource set is correlated to a cluster previously executed queries with similar resource availability.

17. A computer program product, the computer program product comprising a computer readable storage medium having program instructions embodied therewith, the program instructions executable by a processing unit to cause the processing unit to:

receive a first query configured to be processed by a database system, wherein the database system is configured to execute two or more queries concurrently;

identify one or more resource sets;

generate, for the first query, an access plan for each of the one or more resource sets;

determine a first set of available resources that represent an available capacity for the database system;

select a first resource set of the one or more resource sets, wherein the selecting is based on the first set of available resources being closest to the first resource set;

select, based on the set of available resources, a first access plan of the one or more access plans;

execute the first query; and return results of the first query to a source of the first query.

18. The computer program product of claim 17, wherein the program instructions are further configured to cause the processing unit to:

identify two or more potential next steps including a next step for the first access plan and a next alternate next step for a third access plan generated for a third resource set;

identify, in response to executing the first step, a change in the first set of available resources to a second set of available resources;

determine, the second set of available resources is closest to the third resource set;

switch from the first access plan to the third access plan; and execute the alternate second step.

19. The computer program product of claim 17, wherein the one or more access plans are configured to minimize a time required to execute the first query.

20. The computer program product of claim 17, wherein the one or more resource sets are identified by a clustering algorithm and the clustering algorithm analyses previously executed queries at selected sampling times, and each resource set is correlated to a cluster previously executed queries with similar resource availability.

* * * * *